US012638812B2

(12) United States Patent
Canine et al.

(10) Patent No.: US 12,638,812 B2
(45) Date of Patent: May 26, 2026

(54) SYSTEM AND METHOD FOR PROMOTING SAFE INTERACTION WITH ELECTRICAL EQUIPMENT

(71) Applicant: WSP USA Inc., New York, NY (US)

(72) Inventors: Christopher William Canine, New York, NY (US); Charles Mark Koenig, New York, NY (US)

(73) Assignee: WSP USA Inc., New York, NY (US)

( * ) Notice: Subject to any disclaimer, the term of this patent is extended or adjusted under 35 U.S.C. 154(b) by 546 days.

(21) Appl. No.: 18/049,260

(22) Filed: Oct. 24, 2022

(65) Prior Publication Data

US 2024/0134320 A1 Apr. 25, 2024
US 2024/0231285 A9 Jul. 11, 2024

(51) Int. Cl.
*G05B 9/02* (2006.01)
*H02J 3/00* (2006.01)
*H02J 3/388* (2026.01)

(52) U.S. Cl.
CPC ................ *G05B 9/02* (2013.01); *H02J 3/004* (2020.01); *H02J 3/388* (2020.01)

(58) Field of Classification Search
None
See application file for complete search history.

(56) References Cited

U.S. PATENT DOCUMENTS 8,260,736 B1 9/2012 Lear et al.
9,926,852 B2 3/2018 Tiwari et al.

| | | | |
|---|---|---|---|
| 10,205,345 B2 | 2/2019 | Tuerk et al. | |
| 10,708,965 B1 * | 7/2020 | Subramanian | ........ H04W 12/63 |
| 10,960,544 B2 | 3/2021 | Kaminka et al. | |
| 11,269,883 B2 | 3/2022 | Reed | |
| 12,045,025 B1 * | 7/2024 | Gupta | .................... G06N 20/00 |
| 12,045,048 B2 * | 7/2024 | Shinde | ............... G05B 23/0216 |
| 2007/0220590 A1 * | 9/2007 | Rasmussen | ............. H04L 63/08 |
| | | | 726/4 |
| 2011/0172838 A1 * | 7/2011 | Pai | .......................... G05B 15/02 |
| | | | 700/295 |
| 2012/0040698 A1 * | 2/2012 | Ferguson | ............... G06Q 40/04 |
| | | | 455/457 |
| 2013/0332397 A1 * | 12/2013 | Scolnicov | ............. G01M 3/243 |
| | | | 700/36 |
| 2014/0122023 A1 * | 5/2014 | Dewangan | ............. G06Q 50/06 |
| | | | 702/182 |
| 2015/0279112 A1 * | 10/2015 | Meftah | ................. G06T 19/006 |
| | | | 345/633 |

(Continued)

FOREIGN PATENT DOCUMENTS

| | | |
|---|---|---|
| KR | 10-2016-0091095 A | 8/2016 |
| KR | 102318290 B1 | 10/2021 |

*Primary Examiner* — Howard Cortes
(74) *Attorney, Agent, or Firm* — Seed Intellectual Property Law Group LLP

(57) ABSTRACT

An asset management system helps ensure the safety of technicians performing maintenance on electrical power generation assets. The system includes an electronic device operated by a technician. Prior to performing maintenance on a power generation asset, the technician utilizes the electronic device to scan an identification marker on the asset. The electronic device then retrieves, from an asset database, status data regarding the safety status of the asset. The electronic device displays the status data to the technician.

27 Claims, 13 Drawing Sheets

(56) References Cited

U.S. PATENT DOCUMENTS

| 2016/0201648 A1* | 7/2016 | Steele | F03D 7/042 |
| | | | 415/15 |
| 2016/0295426 A1* | 10/2016 | Gormley | H04W 24/02 |
| 2019/0149619 A1* | 5/2019 | Lisac | H04L 67/51 |
| | | | 709/203 |
| 2020/0110651 A1* | 4/2020 | Milman | G06F 11/2263 |
| 2020/0364525 A1* | 11/2020 | Mats | G06K 19/0717 |
| 2021/0157808 A1* | 5/2021 | Reed | G06F 16/2379 |
| 2022/0083048 A1 | 3/2022 | Cella et al. | |
| 2022/0317675 A1* | 10/2022 | Shinde | G06N 20/00 |
| 2022/0374826 A1* | 11/2022 | Volkerink | G06Q 10/087 |
| 2022/0414556 A1* | 12/2022 | Seabloom | H02J 13/00001 |
| 2023/0244890 A1* | 8/2023 | Strauss | G06K 7/146 |
| | | | 235/494 |
| 2023/0353578 A1* | 11/2023 | Heikal | H04L 63/107 |
| 2024/0012835 A1* | 1/2024 | Stinger | G06F 16/24532 |

* cited by examiner

112

| Asset Identification | Asset Type | Asset Location | : : : | Asset Status |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

201 — USER INTERFACE

202

| P | 5.8 MW |
|---|---|
| Q | 1.9 Mvar |
| PF | 0.950 |
| $V_{AB}$ | 35.7 kV |
| $V_{BC}$ | 35.9 kV |
| $V_{CA}$ | 35.9 kV |
| $I_A$ | 98.7 A |
| $I_B$ | 98.1 A |
| $I_C$ | 98.1 A |

52F1

108

204

| ! | Communication Failure |
| ! | Restoration Enabled |
| ! | Maintenance Mode Enabled |

Data Refreshed on DATE at TIME

*1100*

Receive, with an electronic device, identification data from an asset — *1102*

Match the identification data with an asset identification — *1104*

Retrieve, from an asset database based on the asset identification, current status data associated with the asset — *1106*

Display, with the electronic device, the current status data associated with the asset — *1108*

*1200*

Scan, with an electronic device, an
identification marker on an asset — *1202*

Display an image of the asset on
a display of the electronic device — *1204*

Retrieve, from an asset database based
on the asset identification, current
status data associated with the asset — *1206*

Display, with the image, an augmented reality
display including the current status data — *1208*

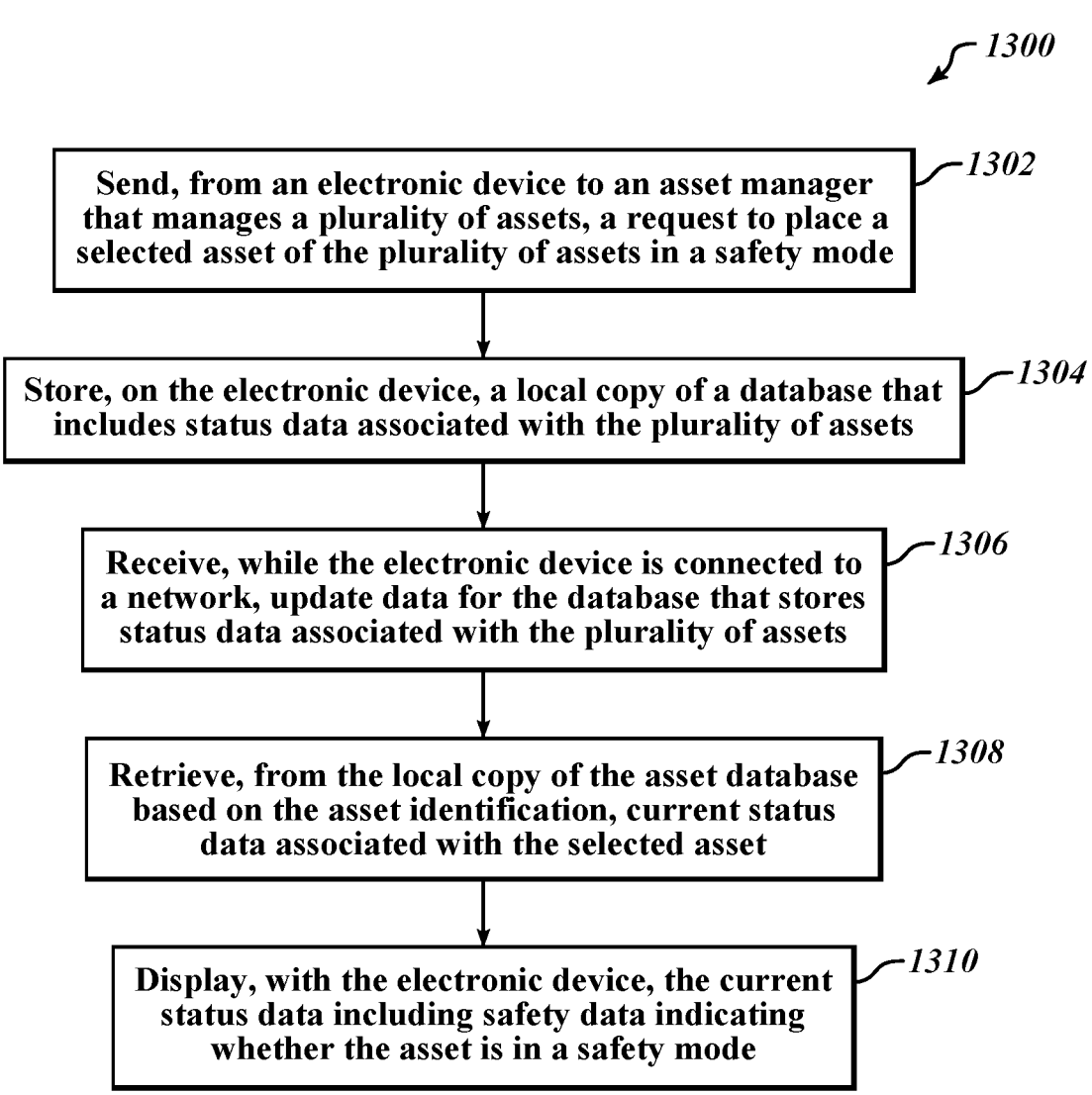

*1300*

*1302*
Send, from an electronic device to an asset manager that manages a plurality of assets, a request to place a selected asset of the plurality of assets in a safety mode

*1304*
Store, on the electronic device, a local copy of a database that includes status data associated with the plurality of assets

*1306*
Receive, while the electronic device is connected to a network, update data for the database that stores status data associated with the plurality of assets

*1308*
Retrieve, from the local copy of the asset database based on the asset identification, current status data associated with the selected asset

*1310*
Display, with the electronic device, the current status data including safety data indicating whether the asset is in a safety mode

FIG.13

SYSTEM AND METHOD FOR PROMOTING SAFE INTERACTION WITH ELECTRICAL EQUIPMENT

BACKGROUND

Technical Field

The present disclosure is related to management of electrical equipment, and more particularly, to ensuring the safety of technicians that perform maintenance on the electrical equipment.

Description of the Related Art

Electricity is utilized in nearly all facets of private and public life. For example, homes, businesses, schools, hospitals, government facilities, industrial facilities, and various other types of buildings, facilities, and industries rely on electricity for their various functions. Electricity is generated by power generation systems such as wind farms, hydroelectric plants, wave energy harvesting systems, fossil fuel power plants, solar panels, and other types of power generation systems. Electricity is distributed via transmission lines, transfer stations, substations, and other systems or installations that provide a power grid.

As such, numerous types of electrical devices and equipment are utilized in the generation and distribution of electricity. Some examples of electrical devices and equipment involved in the generation and distribution of electricity can include wind turbines, hydroelectric turbines, boilers, steam turbines, transmission lines, transformers, voltage regulators, relays, breakers, batteries, flywheels, and other types of equipment.

Equipment associated with power generation and distribution can be important, expensive, and sensitive. As such, it is beneficial that testing and maintenance operations should be performed periodically to ensure the function and operability of equipment. In addition to periodic testing and maintenance, in some instances emergent circumstances may arise and call for immediate inspection and maintenance.

Testing, maintenance, and inspection of assets is typically performed by highly qualified technicians or specialists. In many cases, technicians perform maintenance, inspection, and testing operations by visiting the location of the equipment or assets. Such operations may call for close observation or even physical manipulation of the equipment or assets.

It may be hazardous for a technician to come in near proximity to, or contact with, equipment associated with power generation or distribution. Dangers can include the risk of electrical shock, burns, or other types of dangers. Accordingly, technicians may take various precautions including wearing bulky safety equipment, turning off equipment, or other actions to reduce risk. In spite of these precautions, it may still be dangerous for technicians to come into proximity with electrical equipment associated with the generation and distribution of electricity.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

Embodiments of the present disclosure provide systems and methods that can help ensure the safety of technicians that interact with equipment or assets associated with the generation and distribution of electricity. Embodiments of the present disclosure provide a database that includes data regarding the current status of a large number of assets associated with the generation and distribution of electricity. A technician carries an electronic device that has access to the database. Each asset is marked with an identification marker. When the technician arrives to perform maintenance, observation, or testing related to an asset, the electronic device scans the identification marker. An application on the electrical device identifies the asset in the database and retrieves from the database status data associated with the current status of the asset. The electronic device presents the status data to the user. In one embodiment, the identification marker is a unique identification. In one embodiment, if the electronic device is not able to scan the identification marker then the technician can manually enter identification data into the electronic device.

In one embodiment, the status data has an indication as to the current operating mode of the asset. For example, the asset may be in a normal operating mode, a maintenance mode, a malfunction state, or entirely inoperable. The technician can then utilize this data to take proper precautions while performing maintenance, inspection, or observation on the asset.

In one embodiment, an asset management system may control the operation of a large number of assets. Prior to performance of maintenance, observation, or testing on an asset, the technician may request that the asset management system place the asset in a maintenance mode. The maintenance mode may correspond to the safety mode in which the asset is not fully operational in order to reduce the risk of harm to the technician. When the asset management system places the asset in safety mode, the database is updated to reflect that the asset is in the safety mode. When the user approaches the asset, the user can utilize the electronic device to scan the identification marker prior to performing maintenance or observation. The application retrieves status data associated with the asset and presents the status data to the user. The status data includes whether or not the asset is in the maintenance mode. If the asset is in the maintenance mode, then the technician can proceed with maintenance, testing, or observation. If the asset is not in the maintenance mode, then the technician can refrain from performing maintenance, testing, or observation.

In one embodiment, the real-time database and the application running on the electronic device can help prevent accidents. For example, an asset management system may manage a very large number of assets. When a technician request that an asset be placed in maintenance mode, it is possible that a technician may request the wrong asset. It is possible that the asset management system may place the wrong asset in maintenance mode. It is possible that the asset management system may fail to place any asset in maintenance mode. It is also possible that the technician may travel to the wrong asset after requesting that an asset be placed in maintenance mode. Each of these situations may result in the technician approaching an asset that is not currently in maintenance mode. However, the real-time database and the application running on the electronic device prevent harm to the user because the user scans the identification marker and the electronic device presents data to the user indicating whether or not the electronic device is in maintenance mode. If the electronic device is not in maintenance mode, then the user avoids harm by refraining from performing maintenance, observation, or inspection.

Some portions of the present disclosure may focus primarily on assets that are associated with the generation and distribution of electricity. However, principles of the present disclosure are not limited to assets that are associated with the generation and distribution of electricity. The principles of the present disclosure extend to assets associated with operations such as manufacturing, mining, public or private transportation, fossil fuel extraction or processing, or other types of commercial, industrial, private, or public assets. Principles of the present disclosure extend to distributed networks such as water systems, sewage systems, or other kinds of distributed networks.

BRIEF DESCRIPTION OF THE SEVERAL VIEWS OF THE DRAWINGS

Reference will now be made by way of example only to the accompanying drawings. In the drawings, identical reference numbers identify similar elements or acts. In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility.

FIG. 5 is a representation of an asset database, in accordance with some embodiments.

FIGS. 10-13 are flow diagrams of methods for managing assets, in accordance with some embodiments.

DETAILED DESCRIPTION

Figure 1:
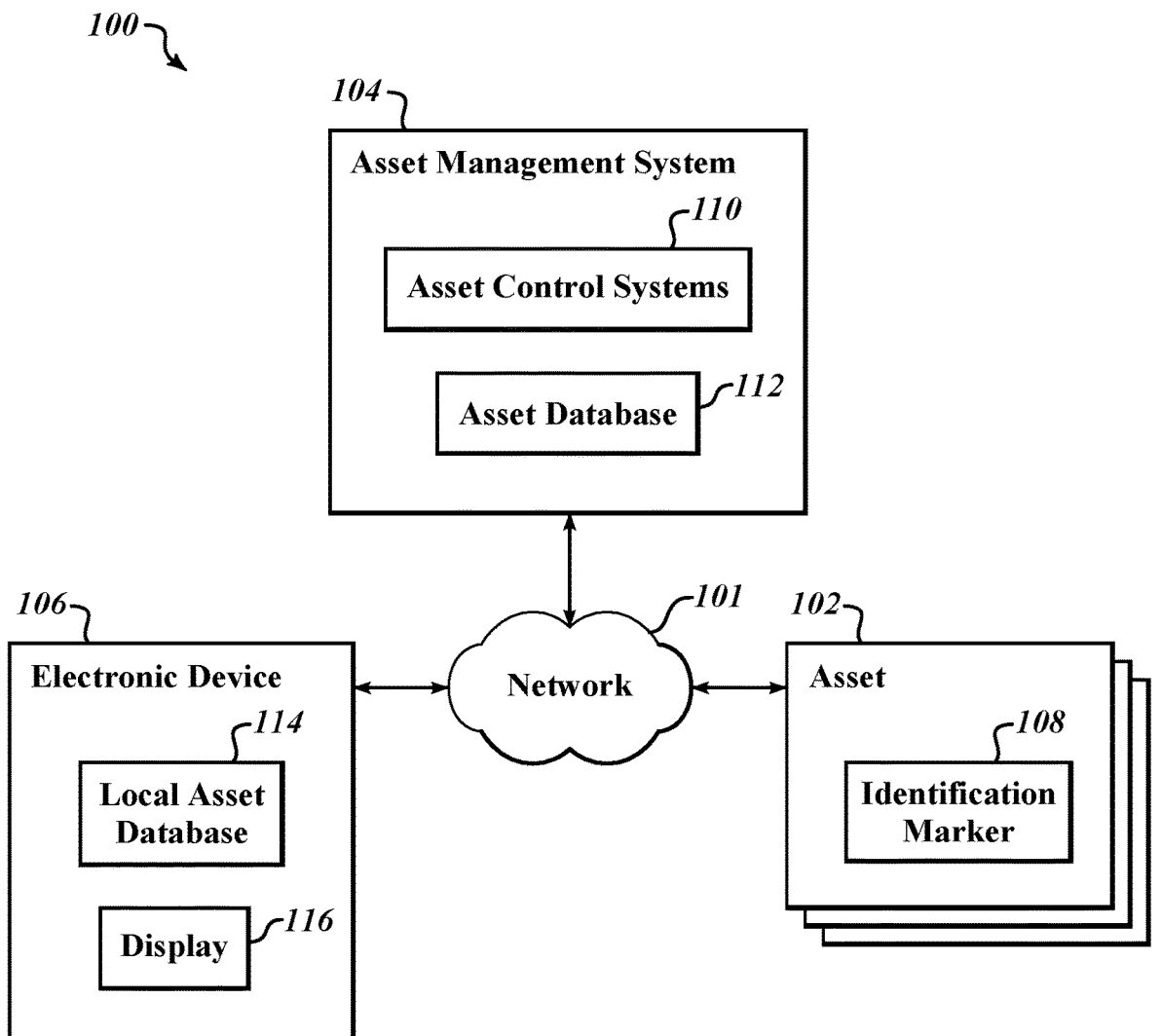
FIG. 1 is a block diagram of a system including assets, and asset management system and an electronic device, in accordance with some embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Embodiments of the present disclosure provide an efficient and effective technical solution to the technical problem of ensuring the safety of technicians or other personnel in performing maintenance, observation, inspection, or testing of assets or equipment associated with generation and distribution of electricity, or other types of assets. Embodiments of the present disclosure provide an asset database that includes entries for a large number of assets associated with one or more asset management systems. The entry for an asset includes an identification that is linked to an identification marker on or near the asset. The entry for an asset includes status data associated with the asset. The status data can include data indicating whether or not the asset is in a maintenance or safety mode. The status data can also include current operational parameters of the asset. The status data can include data related to most recent testing or measurements associated with the assets.

When a technician approaches the asset, the technician utilizes an electronic device that scans the identification marker. The electronic device then retrieves status data from the database based on the identification marker. The electronic device presents the status data to the technician. This ensures that the technician has up-to-date data regarding the status of the assets prior to performing any maintenance, testing, inspection, or observation.

FIG. 1 is a block diagram of a system 100, in accordance with some embodiments. The system 100 includes a plurality of assets 102, an asset management system 104, and an electronic device 106. As will be set forth in more detail below, the components of the system 100 cooperate to ensure that a technician utilizing the electronic device 106 can safely perform maintenance, testing, or observation of the assets 102.

The electronic device 106, the asset management system 104, and the assets 102 may be connected together by one or more networks 101. The one or more networks 101 can include one or more of the Internet, wireless networks, local area networks, Bluetooth communication, an intranet, or other types of networks. Accordingly, while a single network 101 is shown in FIG. 1, in practice, the network 101 may include multiple networks.

In some embodiments, the assets 102 can include devices, systems, machines, or other types of assets that participate in the production and distribution of electricity. The assets 102 can include a generator, a transformer, a steam turbine, a wind turbine, a voltage regulator, a breaker, a relay, a battery, a flywheel, a solar panel, a reactor, a transmission line, a transmission line support, or other types of devices that participate in the production and distribution of electricity. While the present disclosure may primarily describe assets 102 that are part of the production and distribution of electricity, principles of the present disclosure extend to assets that are not part of the distribution or production of electricity. For example, assets 102 can include mining equipment, industrial production equipment, equipment that participates in the discovery, collection, refinement, or transportation of fossil fuels, manufacturing equipment, heavy machinery, vehicles, or other types of assets 102. The assets 102 may be part of a virtual power plant (VPP) that stores electrical energy in a variety of assets and may draw on or transfer electrical energy from the various assets. The assets 102 may include battery storage devices or systems, an electric vehicle, or other types of VPP assets. Other types of assets 102 can be utilized without departing from the scope of the present disclosure.

In many cases, the production and distribution of electricity utilizes a large number of assets. As one example, a wind farm may be utilized to generate electricity to supply or augment a municipal power grid or another type of progress. The wind farm may include a large number of wind turbines dispersed over a wide area. Each wind turbine may correspond to an asset 102. Furthermore, each wind turbine may include a plurality of internal components that participate in the generation of electricity. One or more of these components may also be assets 102. The wind farm may include a plurality of transformers that transform voltages generated by the wind turbines. The transformers may correspond to assets 102. The wind farm includes a network of transmission lines supported by support structures. The transmission lines and support structures may correspond to assets 102. The asset management system 104 may manage or otherwise supervise the assets 102 associated with production and distribution of electricity. The asset management system 104 may correspond to a system controlled or managed by an organization that owns, supervises, or is otherwise involved in the management of the assets 102. The asset management system 104 may include a system operated by a third party that is utilized to manage assets 102 associated with the production and distribution of electricity.

The asset management system 104 includes one or more asset control systems 110. The asset control systems 110 may be communicatively coupled to the assets 102. The asset control systems 110 may include systems that can control the operation of the assets 102. For example, the asset control systems 110 may be configured to turn on the assets 102, turn off the assets 102, or place the assets 102 in standard operation modes, safety operation modes, sleep modes, or other types of modes.

The asset control systems 110 may monitor the status of the assets 102. For example, the asset control system 110 may monitor operating parameters of the assets 102 such as voltage, current, power, temperature or other parameters associated with the operation of the assets 102. The asset control systems 110 may perform other control or monitoring functions related to the assets 102 without departing from the scope of the present disclosure.

In some embodiments, the asset management system 104 maintains an asset database 112. The asset database 112 can correspond to a database of information associated with the assets 102. The asset database can include an entry for each asset 102. The entry for an asset 102 may include data associated with the asset 102.

In some embodiments, the asset database 112 stores, for each asset, data related to the asset. The data can include the manufacturer of the asset 102, the model of the asset 102, the production date of the asset 102, the acquisition date of the asset 102, the date of the most recent maintenance or observation of the asset 102, data associated with a study that involved the asset 102, intended operating parameters of the asset 102, or other types of data.

In some embodiments, the asset database 112 stores, for each asset 102, data related to the current status of the asset 102. For example, the current status data of an asset 102 may indicate whether the asset 102 is turned on, turned off, in a standard operating mode, in a safety operating mode, or another type of operating mode. The current status data of an asset 102 can include data related to current operating parameters of the asset 102. The current operating parameters of an asset 102 can include voltage, current, power, temperature, pressure, or other data associated with current operating parameters of the asset 102.

The asset database 112 may be stored and operated in conjunction with processing resources, memory resources, and communication resources of the asset management system 104. The processing resources, memory resources and communication resources of the asset management system 104 can include physical resources, virtual resources, cloud-based resources, or other types of resources. The asset database 112 may be stored in one or more memories in a single location. The asset database 112 may be stored in a plurality of memories in dispersed locations. The processing resources associated with maintaining, updating, and otherwise managing the asset database 112 can include one or more processors in a single location, a plurality of processors in dispersed locations, or other configurations. The communication resources can include resources for providing data to the asset database 112 or retrieving data from the asset database 112.

In many cases, the asset management system 104 may manage periodic maintenance, testing, or observation of the assets 102. When maintenance, testing, or observation is to be performed on an asset 102, a technician may be sent to the physical location of the asset 102. When the technician arrives at the physical location of the asset 102, the technician may physically interact with the asset 102 in order to perform maintenance or testing of the asset 102. Even when hands-free observation or inspection is to be performed on an asset 102, the technician may be very close to the asset 102.

There can be dangers associated with performing maintenance, testing, or observation of an asset 102. In the example of assets 102 associated with the generation and distribution electricity, there may be a risk of arcing, electrocution, burning, or other harm to a technician that is in close proximity to the asset 102. The components of the system 100 cooperate together to promote the safety of the technician.

In one embodiment, each asset includes an identification marker 108. The identification marker may include a physical marking placed on the exterior of the asset 102 or otherwise situated in a way that enables a technician to see the marking or for an electronic device 106 of the technician to capture an image or otherwise detect the identification marker 108. For example, the identification marker can include a QR code, a barcode, an alphanumeric string, or other types of markings that can include or encode the identification of the asset 102.

In one embodiment, the identification marker 108 can include a sticker or other device that can be attached to the asset 102. The sticker can include a QR code, a bar code, alphanumeric text, or other types of identifiers that can be scanned or read by the electronic device 106.

In one embodiment, the identification marker 108 can include a passive or active wireless transmitter. For example, the identification maker 108 can include an NFC tag that stores identification data. The electronic device 106 can include NFC circuitry that reads the identification data from the NFC tag. In the example of a passive NFC tag, the electronic device 106 can output a carrier field and interrogation signal that energizes the NFC tag and causes the NFC tag to respond by transmitting the identification data. In the Example of an active NFC tag, the NFC tag may include its own power source and may respond to an interrogation signal from the electronic device 106. The identification marker 108 can include other types of wireless transmitters or may transmit data with other protocols such as Bluetooth, Wi-Fi, or other types of wireless protocols. The identification marker can detect the presence of the electronic device 106 and can output the identification data in response to detecting the presence of the electronic device 106.

The electronic device 106 is utilized by the technician to assist in safely performing maintenance, observation, inspection or other operations associated with close proximity management of the assets 102. The electronic device 106 can include a tablet, a smart phone, a laptop computer, smart glasses, or other types of electronic devices.

The electronic device 106 can include a sensor that can detect the identification marker 108 of an asset 102. For example, the electronic device 106 can include one or more image capture devices such as visible light cameras, infrared light cameras, UV light cameras, or other types of cameras that can capture an image of the identification marker 108. The electronic device 106 can include a barcode scanner or other types of sensor equipment for reading the identification marker 108. The electronic device 106 can include resources for analyzing images or other sensed parameters in order to determine the unique identification included by the identification marker 108.

The electronic device 106 includes a display 116. The display 116 is configured to be viewed by the technician when performing maintenance, testing, or observation of an asset 102. For example, when the technician approaches the asset 102, the technician can manipulate electronic device 106 to capture an image of the identification marker 108. The electronic device 106 determines the identity of the asset 102 based on the image or other sensed parameters of the identification marker 108. The electronic device 106 presents data on the display 116. Further details regarding the types of data presented by the display 116 are provided below.

In some embodiments, the electronic device 106 includes a local copy of the asset database 114. The local copy of the asset database 114 can include some or all of the data stored in the asset database 112 by the asset management system 104. As will be set forth in more detail below, the local copy of the asset database 114 helps to ensure the safety of the technician.

In one example, a technician is assigned to perform maintenance on an asset 102. However, before the technician can perform maintenance on the asset 102, the technician requests that the asset management system 104 place the asset in the maintenance or safety mode. The maintenance or safety mode may correspond to a mode in which the asset 102 is not operating at full capacity or in a standard operating mode. In the maintenance or safety mode, the asset 102 may be in a sleep mode or may otherwise be effectively rendered inoperable. In the safety mode, the technician can more safely approach the asset 102 or can more safely perform maintenance on the asset 102.

Due to the large number of assets 102, it is possible that the asset management system 104 may place the incorrect asset 102 in safety mode. Likewise, due to the large number of assets 102, it is possible that the technician may mistakenly approach the incorrect asset 102. In either case, it is possible that the technician approaches an asset 102 that is not in safety mode. This can be very hazardous to the technician.

Principles of the present disclosure help ensure the safety of the technician. In particular, when the technician approaches the asset 102, the technician activates an application on the electronic device 106. The application can correspond to a dedicated program, module, or engine operated by the electronic device 106 in order to help ensure the safety of the technician when performing maintenance, testing, or observation of an asset 102 or to otherwise obtain status data of the asset 102. The technician positions the electronic device 106 to capture an image of the identification marker 108 on the asset 102, or to otherwise sense the identification marker 108. The electronic device 106 extracts the unique identification of the asset 102 from the identification marker 108.

After the electronic device 106 has extracted unique identification of the asset 102 from the identification marker 108, the electronic device 106 matches the unique identification to an entry in the asset database 112 associated with that asset 102. The electronic device 106 then retrieves data associated with the asset 102 from the database 112. The electronic device 106 presents the data associated with the asset 102 on the display 116. Matching the unique identification to an entry in the asset database 112 can include matching the unique identification to the asset database 112 by communicating with the asset management system 104 or by matching the unique identification to the local asset database 114 on the electronic device 106.

In some embodiments, the data associated with the asset 102 can include the current status of the asset. In particular, electronic device 106 can display whether the asset is in a standard operating mode, a safety mode, or another type of mode. The user can view the current status of the asset 102. If the current status indicates that the asset is not in the safety mode, then the user can refrain from further approaching or manipulating the asset 102.

In some embodiments, the data associated with the asset 102 can include the identification of the asset. The user may view the identification and can determine whether or not the technician has approached the intended asset 102. If the user has approached the intended asset 102, but the intended asset is not in the safety mode, then the user may utilize the electronic device 106 to communicate with the asset management system 104 to request that the asset management system 104 place the asset 102 in the safety mode.

In some embodiments, the technician may determine whether additional protective equipment should be worn or utilized based on the current status of the asset 102 as displayed by the electronic device 106. For example, if the asset 102 is not in the safety mode, then the technician may put on additional safety equipment to be able to safely perform maintenance, testing, or observation on the asset 102.

In some embodiments, the electronic device 106 displays recommended safety equipment to the technician via the display 116. The electronic device 106 can display the recommended safety equipment based on the current status of the asset 102.

In some embodiments, the electronic device 106 continuously updates the local asset database 114 by syncing with the asset database 112 from the asset management system 104. In this way, the electronic device 106 can obtain up-to-date data from the asset management system 104. In particular, the electronic device 116 may update the asset database 112 after a selected number of seconds, minutes, or hours. In some embodiments, the electronic device 106 updates the local copy of the asset database 114 when the user utilizes the application or scans an identification marker 108.

Updating the local copy of the asset database 114 can include requesting update data from the asset management system 104. The asset management system may push data from the asset database 112 to the electronic device 106 so that the electronic device 106 can update the local copy of the asset database 114. Updating the local copy of the asset database 114 can include syncing the local copy of the asset database 114 with the asset database 112 stored by the asset management system 104.

In some situations, it is possible that the electronic device 106 may be out of range of the network 101 when the technician approaches the asset 102. In the example of a wind farm, the wind turbines may be dispersed over a large area in a remote location. It is possible that there will be no cellular or other wireless network available to the electronic device 106 to update the local copy of the asset database. In these situations, prior to leaving the coverage of the network 101, the technician can manually request an update to the local copy of the asset database from the asset management system 104. In other cases, the electronic device 106 may regularly update the local copy of the asset database 114 with a relatively high frequency such that the asset database 114 is very likely to be up-to-date when the user leaves the coverage of the network 101. Accordingly, the technician may rely entirely on the local copy of the asset database 114 when approaching an asset 102 to determine the identity or current status of the asset 102.

In some embodiments, the electronic device 106 may display an alert to the technician that the electronic device 106 is not connected to a network and cannot update the local copy of the asset database 114. This can indicate to the technician that the status information may not be up-to-date and that additional precautions should be taken by the technician prior to approaching the asset 102.

In some embodiments, the electronic device 106 may not refer to a local copy of the asset database 114 at all. Instead, the electronic device 106 may scan the identification marker 108 and may provide the unique identification to the asset management system 104. The asset management system 104 may then match the unique identification to an entry in the asset database 112 stored by the asset management system 104. The asset management system 104 may then retrieve the data associated with the unique identification of the asset from the asset database 112. The asset management system 104 may then provide the data to the electronic device 106 via the network 101. The electronic device can then display the data associated with the asset 102 to the user via the display 116.

In some embodiments, the electronic device 106 utilizes augmented reality (AR) when displaying information related to an asset 102 to the technician. For example, the camera on electronic device 106 may capture a continuous stream of images of the environment around the technician. The image stream may be provided to the user via the display 116. The electronic device 106 may utilize AR to display data related to the asset 102 overlying the image on the display 116. The data can include the identification of the asset 102, the current status of the asset 102, or other data associated with the asset 102.

In some embodiments, the technician may be in the presence of several assets 102. In these cases, the technician may position (or aim) the electronic device 106 so that the camera or other sensor reads the identification marker 108 of the various assets 102. The AR functionality of the electronic device 106 may continuously update the display such that the display always shows the data associated with whichever asset 102 toward which the camera or sensor of the electronic device 106 is pointing. In the presence of a large number of assets 102, this can assist the user to quickly identify the correct asset.

In some embodiments, the technician can enter an identification number associated with an intended asset to the electronic device 106. As the technician points the electronic device 106 toward various assets 102, the AR feature can indicate to the user whether or not the user is pointing at the correct asset 102 based on reading the identification marker 108 on the asset 102. For example, the electronic device 106 can display particular colors, symbols, or images to indicate to the technician that the technician is viewing the correct asset 102.

In some embodiments, the electronic device 106 can help guide the user to the correct asset 102. For example, the database 112 may store geolocation data associated with the assets 102. The geolocation data can include GPS coordinates or other location data associated with the assets 102. If the user enters the identification of a target asset 102, then the electronic device 106 can provide indicators as to which direction the asset 102 is located. For example, if the target asset 102 is directly ahead, then an AR indicator arrow can point directly ahead. If the target asset 102 is in a direction left or right of the current orientation of the electronic device 106, the electronic device 106 can display AR indicators as to the correct direction of the target asset 102. The AR display can be updated continuously.

In some embodiments, the electronic device 106 is able to wirelessly communicate with the asset 102. For example, when the electronic device 106 reads the identification marker of an asset 102, the electronic device 106 can establish wireless communication with the asset 102. The electronic device 106 can receive data associated with the asset 102 from the asset 102 via the wireless connection. The wireless connection can include a connection via a network 101.

In some embodiments, when the electronic device 106 establishes communication with the asset 102, the electronic device 106 activates a hidden human machine interface (HMI) of the asset 102. Not only is data associated with the asset provided via the display 116, the display 116 presents a graphical user interface that enables the user to input commands to the asset 102 without physically touching the asset 102. These commands can include turning off the asset 102, turning on the asset 102, activating a standard operating mode, activating a safety operating mode, or other types of commands. The commands can include requests for particular status data associated with the asset 102.

In some embodiments, if the asset 102 is not currently in a safety mode, the electronic device 106 may request whether the user would like to put the asset 102 in a safety mode. In some embodiments, if the asset 102 is not currently in a safety mode, then the electronic device 106 may automatically place the asset 102 in a safety mode responsive to establishing wireless communication with the asset 102.

In some embodiments, the electronic device 106 may not directly establish a wireless connection with a targeted asset 102. Instead, the electronic device 106 may be connected to the asset management system 104. The asset management system 104 is, in turn, connected to the assets 102. When the hidden HMI is displayed by the electronic device 106, the commands entered by the technician, for instance by touching the display 116 or by touching other inputs, are relayed to the target asset 102 via the asset management system 104.

Figure 2:
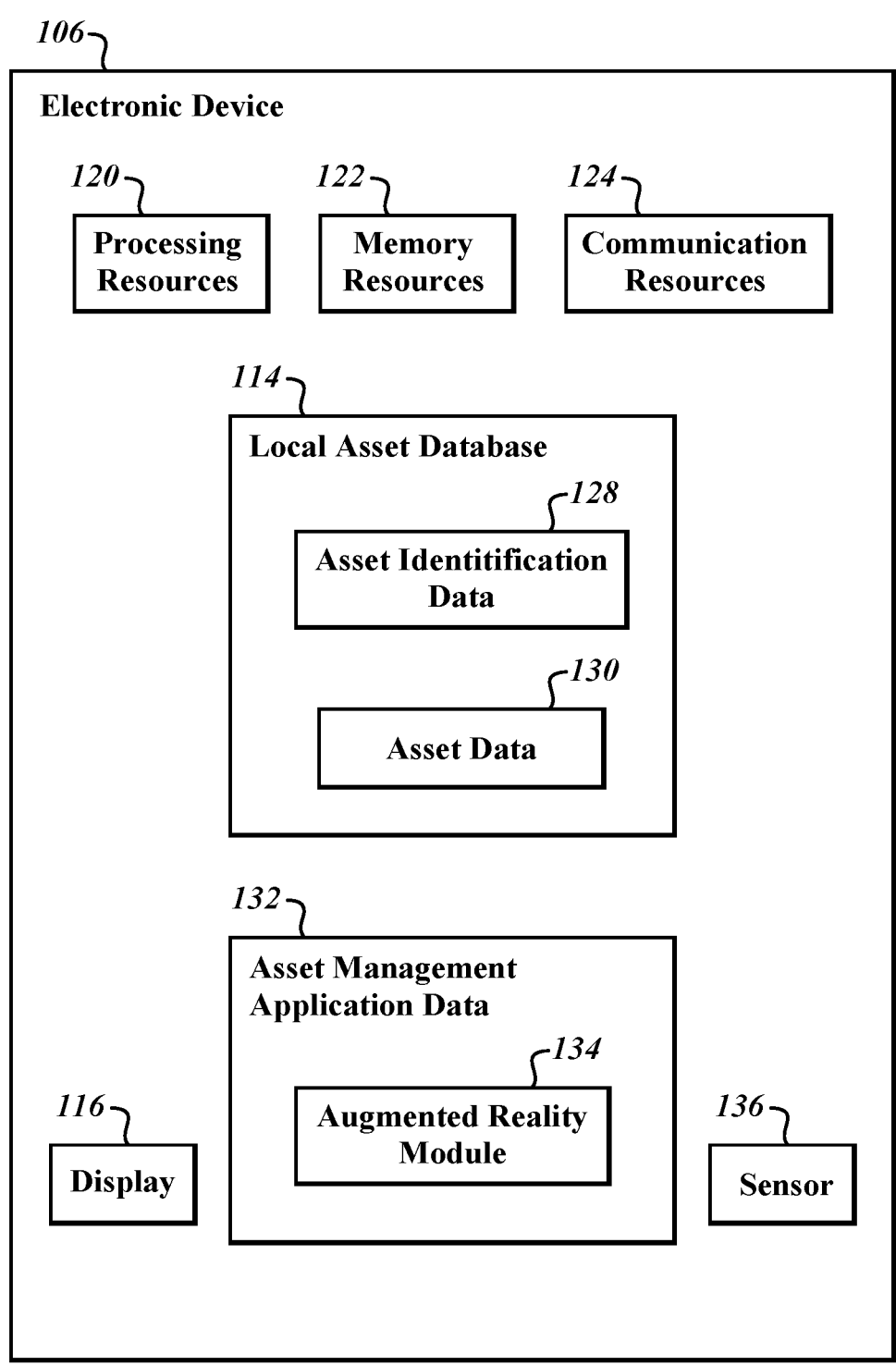
FIG. 2 is a block diagram of an electronic device, in accordance with some embodiments.

FIG. 2 is a block diagram of an electronic device 106, in accordance with some embodiments. The electronic device 106 of FIG. 2 is one example of an electronic device 106 of FIG. 1. The components, systems, and resources of the electronic device 106 cooperate to assist a technician to safely approach assets 102 as described in relation to FIG. 1.

The electronic device 106 includes processing resources 120. The processing resources 120 can include one or more microprocessors, one or more microcontrollers, or other types of processors or processing resources. The processing resources 120 can be utilized to execute software instructions, to control communication resources, to control various components of the electronic device 106, to read data from memory, to write data to memory, to erase data in memory, or to otherwise control the overall operation of the electronic device 106. In some embodiments, the processing resources 120 may also include virtual processing resources such as cloud-based processing resources to assist the function of the electronic device 106.

The electronic device 106 includes memory resources 122. The memory resources 122 can include one or more computer memories. The memory resources 122 can include read-only memory (ROM), random access memory (RAM), and other types of memories. The memory resources 122 can include electrically erasable and programmable ROM (EEPROM) flash memory, SRAM, DRAM, registers, buffers, and other types of memories. The memory resources 122 can store software instructions to be executed by the processing resources 120 to perform the functions of the electronic device 106. The memory resources 122 can store the local copy of the asset database 114. The memory resources 122 can store other data associated with the operation of the electronic device 106. In some embodiments, the memory resources 122 may utilize virtual memory resources, such as cloud-based memory resources.

The electronic device 106 includes communication resources 124. The communication resources 124 can include one or more wireless transceivers for transmitting and receiving data or commands via one or more networks 101. The communication resources 124 can include one or more wired connections for transmitting data or commands. The communication resources 124 can include one or more ports such as USB ports, Ethernet ports, or other types of ports for connecting one or more devices to the electronic device 106 via a wired connection. The electronic device 106 can include other types of communication resources.

The electronic device 106 includes a local copy of the asset database 114, as described in relation to FIG. 1. The local copy of the asset database 114 is shown as separate from the memory resources 122. However, in practice, the local copy of the asset database 114 is stored in the memory resources 122. The communication resources 124 can be utilized to update the local copy of the asset database 114 as described in relation to FIG. 1. In one embodiment, the memory resources 122 can include removable media such as SD cards, micro SD cards, USB thumb-drives, or other types of memory devices that can be coupled and decoupled from the electronic device 106. The local copy of the asset database 114 can be stored in the memory resources 122.

The local copy of the asset database 114 includes asset identification data 128. The asset identification data 128 can include the unique identification of each of a plurality of assets 102. The local asset database 114 includes asset data 130. The asset data 130 can include asset type, asset manufacturer, manufacture date, a date at which operation of the asset began, asset location, asset status data, and other types of data related to the assets 102. The asset status data can include a current operational mode of the asset 102, current operational parameters associated with the asset 102, or other types of status data.

The electronic device 106 includes asset management application data 132. The asset management application data 132 corresponds to an asset management application that assists the technician in safely performing maintenance, inspection, or observation of assets. The asset management application data 132 may be stored in the memory resources 122 and executed by the processing resources 120. When a technician wishes to perform maintenance, inspection, or observation on an asset 102, the technician can activate the asset management application. The asset management application can then assist the user to safely interact with the asset 102 as described previously.

The asset management application data 132 can include an AR module 134. The AR module 134 can perform AR functions described in relation to FIG. 1. In particular, the AR module 134 can provide asset data, directions to an asset, asset HMI, or other data or functions in an AR presentation for the technician. For example, asset data may be output overlying real-time images captured by the electronic device 106. The AR module 134 can perform other types of AR functions without departing from the scope of the present disclosure. The AR module 134 may be part of other modules or systems. The AR module 134 may be part of the processing resources 120 or may be implemented by processing resources 120 executing software instructions in the memory resources 122.

The electronic device 106 includes a display 116. The display 116 can correspond to a screen, a monitor, a smart glasses display, or other types of displays that can output data to a technician in a visual manner.

Electronic device 106 may include a sensor 136. The sensor 136 can include an image capture sensor such as a visible light camera, an infrared camera, an ultraviolet camera, or other types of image capture sensors. The sensor 136 can include a sensor that reads identification markers 108 such as barcodes, QR codes, or other types of identification markers 108. Various other types of sensors 136 can be utilized without departing from the scope of the present disclosure.

The electronic device 106 can be a smart phone, a tablet, a laptop, smart glasses, or other types of electronic devices. The electronic device 106 may be a device that a technician can hold or wear. Various other types of electronic devices 106 can be utilized without departing from the scope of the present disclosure. Furthermore, the electronic device 106 can have other systems, components, and applications without departing from the scope of the present disclosure.

Figure 3:
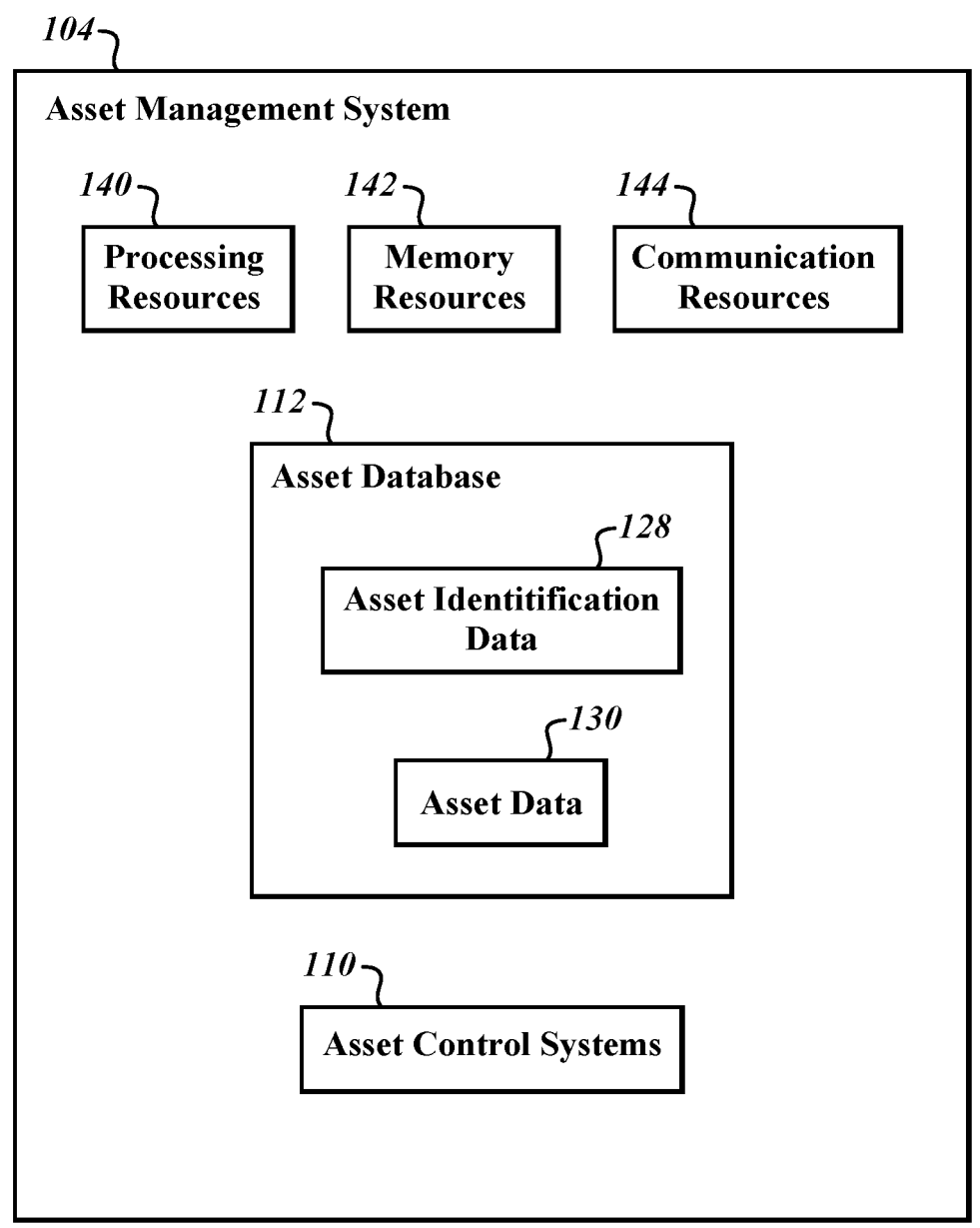
FIG. 3 is a block diagram of an asset management system, in accordance with some embodiments.

FIG. 3 is a block diagram of an asset management system 104, in accordance with some embodiments. The asset management system 104 of FIG. 3 is one example of an asset management system 104 of FIG. 1. The asset management system 104 may manage or otherwise supervise the assets 102 associated with production and distribution of electricity. The asset management system 104 may correspond to a system controlled or managed by an organization that owns, supervises, or is otherwise involved in the management of the assets 102. The asset management system 104 may include a system operated by a third party that is utilized to manage assets 102 associated with the production and distribution of electricity.

The asset management system 104 includes processing resources 140. The processing resources 140 can include one or more microprocessors, one or more microcontrollers, or other types of processors or processing resources. The processing resources 140 can be utilized to execute software instructions, to control communication resources, the control various components of the asset management system 104, to read data from memory, to write data to memory, to erase data in memory, or to otherwise control the overall operation of the asset management system 104. In some embodiments, the processing resources 140 may also include virtual processing resources such as cloud-based processing resources to assist the function of the asset management system 104.

The asset management system 104 includes memory resources 142. The memory resources 142 can include one or more computer memories. The memory resources 142 can include ROM, RAM, EEPROM, flash memory, SRAM, DRAM, registers, buffers, and other types of memories. The memory resources 142 can store software instructions to be executed by the processing resources 140 to perform the functions of the asset management system 104. The memory resources 142 can store other data associated with the operation of the asset management system 104. In some embodiments, the memory resources 142 may utilize virtual memory resources, such as cloud-based memory resources.

The asset management system 104 includes communication resources 144. The communication resources 144 can include one or more wireless transceivers for transmitting and receiving data or commands via one or more networks 101. The communication resources 144 can include one or more wired connections for transmitting data or commands. The communication resources 144 can include one or more ports such as USB ports, Ethernet ports, or other types of ports for connecting one or more devices to the asset management system 104 via a wired connection. The asset management system 104 can include other types of communication resources.

The asset management system 104 includes one or more asset control systems 110. The asset control systems 110 may be communicatively coupled to the assets 102. For example, the communication resources 144 of the asset management system 104 may enable the asset management system 104 to communicate with the assets 102 and the electronic device 106. The asset control systems 110 may include systems that can control the operation of the assets 102. For example, the asset control systems 110 may be configured to turn on the assets 102, turn off the assets 102, or place the assets 102 in standard operation modes, safety operation modes, sleep modes, or other types of modes.

The asset control systems 110 may monitor the status of the assets 102. For example, the asset control system 110 may monitor operating parameters of the assets 102 such as voltage, current, power, temperature or other parameters associated with the operation of the assets 102. The asset control systems 110 may perform other control or monitoring functions related to the assets 102 without departing from the scope of the present disclosure.

The asset management system 104 stores and maintains the asset database 112. The asset database 112 corresponds to the primary or main copy of the asset database 112. While the electronic device 106 may store a local asset database 114 that is synced with the asset database 112, the asset database 112 is the primary or master copy of the asset database. As described previously, the asset database 112 can include asset identification data 128 and asset data 130. The asset database 112 may also be called a remote asset database because the asset database 112 may be remote from the electronic device 106 and the assets 102. While the present disclosure describes the asset management system 104 storing and maintaining the asset database 112, the asset management system 104 may also perform various other functions related management of assets 102.

Figure 4:
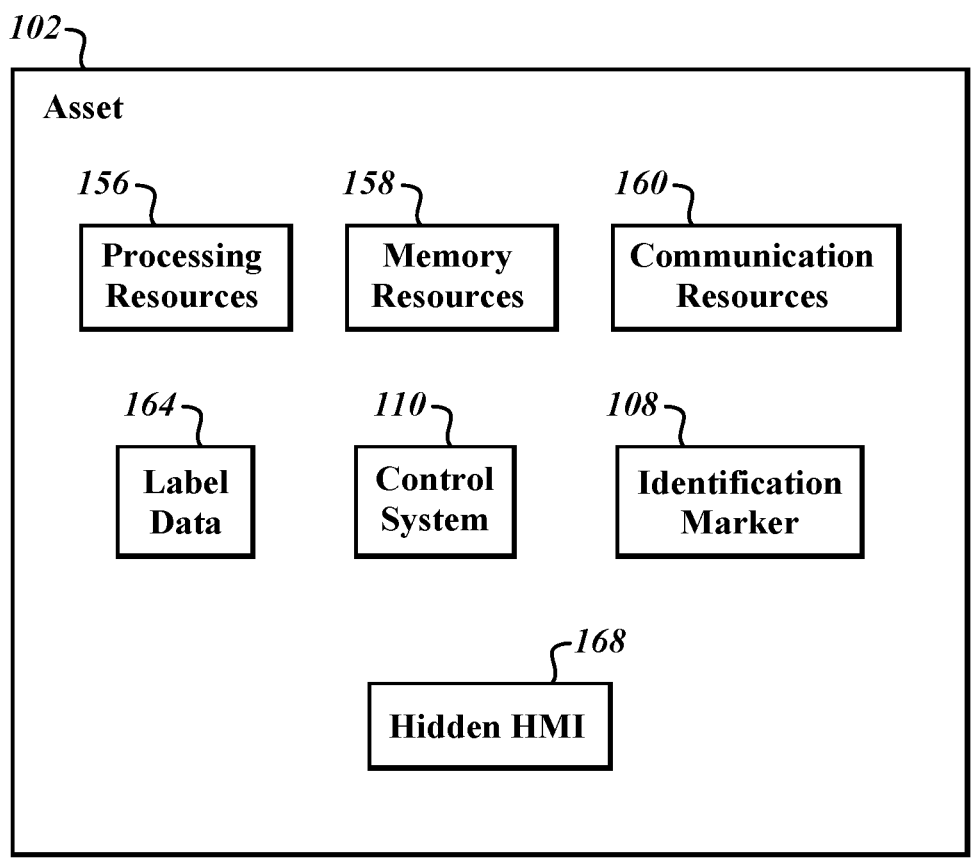
FIG. 4 is a block diagram of an asset, in accordance with some embodiments.

FIG. 4 is a block diagram of an asset 102, in accordance with some embodiments. The asset 102 of FIG. 4 is one example of an asset 102 of FIG. 1. In some embodiments, the asset 102 can include a generator, a transformer, a steam turbine, a wind turbine, a voltage regulator, a breaker, a relay, a battery, a flywheel, a solar panel, a reactor, a transmission line, a transmission line support, or other types of devices that participate in the production and distribution of electricity. In some embodiments, the asset 102 can include machines, systems, or devices associated with industrial manufacturing, mining, fossil fuel production, or other types of industrial equipment.

The asset 102 includes processing resources 156. The processing resources 156 can include one or more microprocessors, one or more microcontrollers, or other types of processors or processing resources. The processing resources 156 can be utilized to execute software instructions, to control communication resources, the control various components of the asset 102, to read data from memory, to write data to memory, to erase data in memory, or to otherwise control the overall operation of the asset 102. In some embodiments, the processing resources 156 may also include virtual processing resources such as cloud-based processing resources to assist the function of the asset 102.

The asset 102 includes memory resources 158. The memory resources 158 can include one or more computer memories. The memory resources 158 can include ROM, RAM, EEPROM, flash memory, SRAM, DRAM, registers, buffers, and other types of memories. The memory resources 158 can store software instructions to be executed by the processing resources 156 to perform the functions of the asset 102. The memory resources 158 can store other data associated with the operation of the asset 102. In some embodiments, the memory resources 158 may utilize virtual memory resources, such as cloud-based memory resources.

The asset 102 includes communication resources 160. The communication resources 160 can include one or more wireless transceivers for transmitting and receiving data or commands via one or more networks 101. The communication resources 160 can include one or more wired connections for transmitting data or commands. The communication resources 160 can include one or more ports such as USB ports, Ethernet ports, or other types of ports for connecting one or more devices to the asset 102 via a wired connection. The asset 102 can include other types of communication resources.

The asset 102 may include label data 164. The label data 164 can include data related to the manufacture, operation, location, or other data associated with the asset 102. In many cases, an asset includes a physical label that can be read by technician. However, the asset 102 may also store the data associated with the label as the label data 164. The label data 164 may include many of the same types of data as the asset data 130 associated with the asset 102 in the asset database 112.

In one embodiment, the label data 164 can include data associated with a most recent study performed in relation to the asset 102. For example, maintenance organizations may periodically perform arc flash studies. The arc flash study can correspond to an analysis attempting to establish safety protocols for technicians that may work on the asset 102. The arc flash study may include an analysis that establishes safety protocols to protect technicians during interaction with assets 102 or to otherwise protect technicians in proximity to assets 102. For example, some assets 102 may not be able to be placed in a maintenance or safety mode. The arc flash study can provide information that indicates safe operating parameters and safety protocols that should be undertaken by a technician in relation to the asset.

Typically, the arc flash study is performed in relation to a system that includes a plurality of assets that each function as part of the system. Because the function of each asset 102 and the system is impacted, in part, by the configuration and function of other assets 102 in the system, the arc flash study takes into account the role each asset 102 plays in the system and how each asset is connected to or cooperates with the other assets 102.

Accordingly, many assets 102 include a label that provides safety information or operating information related to the asset 102. In some cases, labels may fade or may not have been properly placed. Accordingly, the asset 102 stores label data 164. When a technician utilizes the electronic device 106 to identify an asset 102 and to view current operating parameters of the asset 102, the electronic device 106 may retrieve the label data 164 directly from the asset 102 or from the asset management system 104.

In some embodiments, the asset 102 includes a hidden HMI 168. The hidden HMI 168 enables a technician to utilize the electronic device 106 to control functions of the asset 102, to retrieve data from the asset 102, or to otherwise communicate with the asset 102. The image of the HMI 168 may be presented on the electronic device 106 as an AR presentation. The HMI 168 may be presented in ways other than AR. For example, the HMI may be presented as an image on a display or in other ways.

The asset 102 includes an identification marker 108. The identification marker 108 can include a visual marking that can be utilized to obtain the unique identification of the asset 102. The identification marker 108 can include a barcode, a QR code, an alphanumeric string, or another type of marking that enables the electronic device 106 to scan and obtain the unique identification of the asset 102. As described previously, the identification marker 108 can include wireless identification components or systems such as NFC, Wi-Fi, Bluetooth, or other types of wireless components, systems, or protocols. The asset 102 can include other components and systems without departing from the scope of the present disclosure.

FIG. 5 is a representation of an asset database 112, in accordance with some embodiments. The asset database 112 of FIG. 5 is one example of the asset database 112 of FIG. 1. The local asset database 114 may be substantially identical to the asset database 112. The asset database includes a plurality of rows and columns. Each row corresponds to a particular asset. The first column corresponds to an asset identification. The asset identification can be the unique identification associated with a particular asset 102. When the electronic device 106 scans the identification marker 108 on an asset 102, the electronic device matches the identification of the asset 102 with an asset identification in the asset database 112.

The asset database 112 includes, for each asset, various types of data associated with the asset. In other words, each column of the asset database 112 corresponds to a particular data type. In the example of FIG. 5, the second column is an asset type. The asset type may identify the type of an asset 102, such as whether the asset is a wind turbine, a generator, a breaker, a relay, or another type of asset. A next column corresponds to an asset location. The asset location can include GPS coordinates associated with an asset. The asset location can also include a position of an asset among a plurality of other assets of a particular location. Though not shown in FIG. 5, the asset database 112 can include columns for manufacturer, manufacture date, the date of most recent maintenance, inspection, or study, or various other types of data. The asset database can include asset status data. The asset status data can include current status of an asset, such as a current operational mode of the asset, current operating parameters of the asset, or other types of status data associated with an asset 102. The asset database 112 can include other formats and other types of data than shown in FIG. 5 without departing from the scope of the present disclosure.

Figure 6:
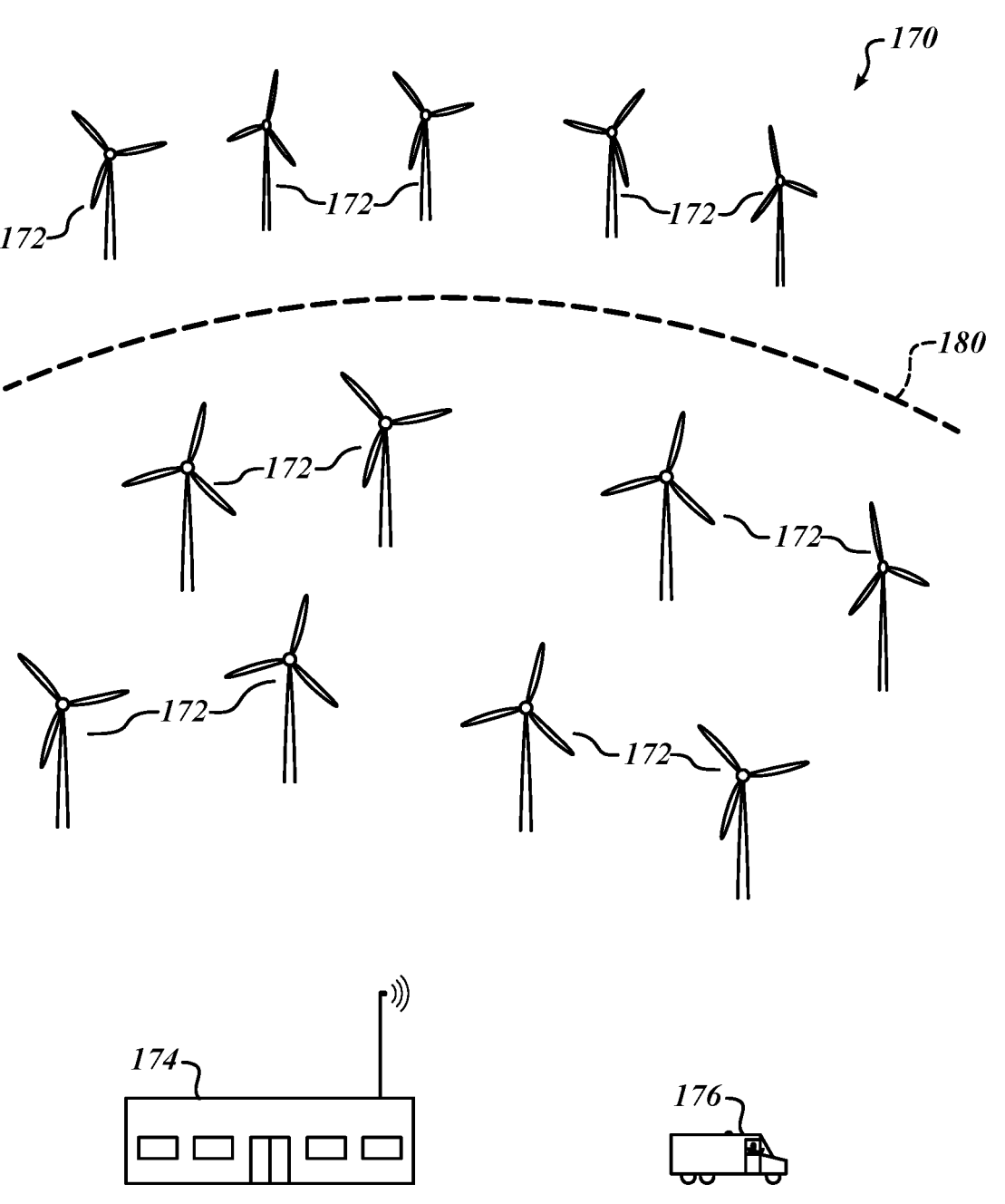
FIG. 6 is an illustration of a wind farm, in accordance with some embodiments.

FIG. 6 is an illustration of a wind farm 170, in accordance with some embodiments. The wind farm 170 includes a plurality of wind turbines 172. Each wind turbine 172 is an example of an asset 102 of FIG. 1. The wind turbines 172 are dispersed over a relatively large area. Each wind turbine generates electricity. Though not shown in FIG. 6, the wind farm 170 may include a plurality of other systems and components. For example, the wind farm 170 may include a plurality of transformers, transmission lines, and other systems, devices, or components associated with the generation and distribution of electricity in the wind farm 170.

The wind farm 170 includes a control facility 174. The control facility 174 may control or monitor the operation of the wind farm 170. In particular, the control facility 174 may monitor or control the operation of the wind turbines 172 and the other components of the wind farm 170. The control facility 174 may include an asset management system 104, or portions of an asset management system 104. In other words, portions of the processing resources, memory resources, communication resources, and control systems associated with an asset management system 104 may be located at the control facility 174. The control facility 174 may also include resources that store or maintain the asset database 112.

FIG. 6 illustrates the boundary 180 of a communication network. The communication network may be part of a network 101 is described in relation to FIG. 1. In one example, the boundary 180 is the boundary of a cellular network. Some of the wind turbines 172 are within the boundary 180. Some of the wind turbines 172 are outside of the boundary 180.

FIG. 6 illustrates a maintenance vehicle 176. The maintenance vehicle 176 may be utilized by the technician to travel to the wind turbines 172 or to other components of the wind farm 170 in order to perform maintenance, inspection, or observation of the wind turbines 172 or other assets 102.

Prior to traveling to the location of a wind turbine 172, the technician may communicate with the control facility 174 to place the wind turbine in a safety or maintenance mode so that the technician can safely perform maintenance, testing, or observation on the wind turbine 172. The control facility 174 may have a wired or a wireless communication connection with each of the wind turbines 172 and may place a selected wind turbine 172 in the maintenance or safety mode via a wired or wireless connection. In the example of a wireless connection, the wireless connection may be implemented via a network other than the network for which the boundary 180 is shown in FIG. 6.

After the technician has communicated with the control facility 174 to place the wind turbine 172 in the maintenance mode, the technician may utilize the maintenance vehicle 176 to travel to the wind turbine 172. The technician may utilize the electronic device 106 to provide directions, for example in an AR mode, to the wind turbine 172.

In some embodiments, if the selected wind turbine 172 is within the boundary 180 of the network, then when the technician utilizes the electronic device 106 to scan the identification marker 108, the electronic device 106 may first update the local copy of the asset database 114 prior to providing the current status and identification of the wind turbine to the technician. Alternatively, the electronic device 106 may simply request and receive status data associated with the wind turbine from the asset management system 104. In this way, the technician can determine whether or not the wind turbine 172 is in the maintenance or safety mode.

In some embodiments, if the selected wind turbine 172 is outside the boundary 180 of the network, then when the technician travels to the selected wind turbine 172, the electronic device 106 relies entirely on the local copy of the asset database 114 to retrieve the current status of the wind turbine 172. While the electronic device 106 has network connection, the electronic device 106 can continuously update the local copy of the asset database 114 in order to ensure that the local copy of the asset database 114 has as current data as possible.

While FIG. 6 illustrates a wind farm 170, principles described in relation to FIG. 6 can extend to various other types of systems of assets 102. For example, principles of the present disclosure can extend to dispersed drilling equipment, mining equipment, wave energy harvesting systems, or other types of systems in which assets 102 may be dispersed over a relatively large area.

Figure 7:
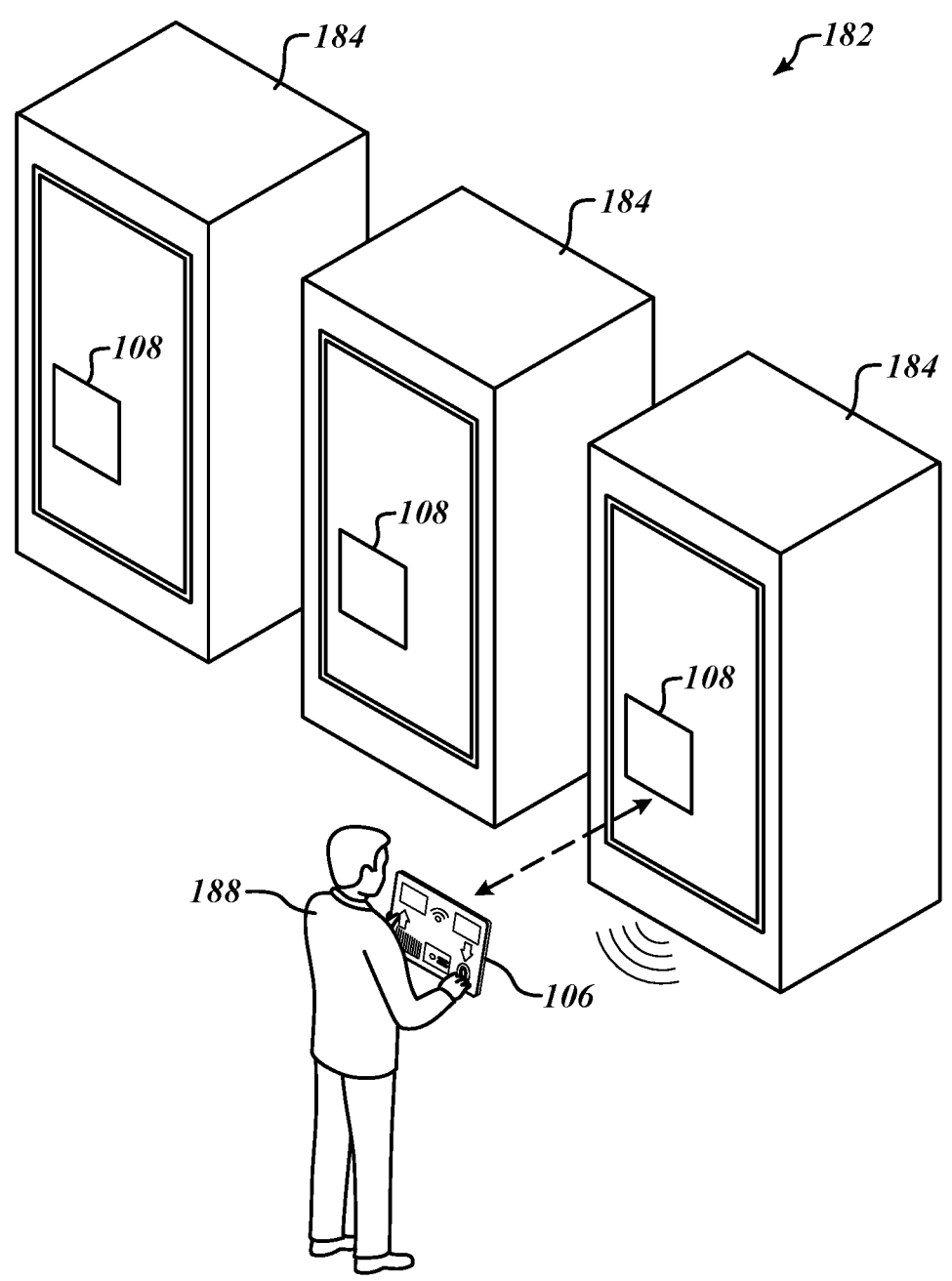
FIG. 7 is an illustration of substation including a plurality of relays, in accordance with some embodiments

FIG. 7 is an illustration of a portion of a power generation substation 182, in accordance with some embodiments. In FIG. 7, a plurality of relays 184 are located within the substation 182. A technician 188 has traveled to the substation 182 in order to perform maintenance or inspection on one or more of the relays 184.

The technician 188 holds an electronic device 106. The technician 188 utilizes an asset maintenance application with the electronic device 106. Each relay 184 includes an identification marker 108. When the electronic device scans an identification marker 108 on a particular relay 184, the electronic device 106 presents data associated with the relay 184 on the display of the electronic device 106. This can include presenting an AR presentation in which data associated with the relay 184 is presented overlying a real time image or video feed of the relay 184. The data presented by the electronic device 106 can include an identification and a current operating state of the relay 184. This can ensure that the technician 188 is dealing with the correct relay 184. As the technician 188 points the electronic device 106 at various relays 184, the electronic device 106 presents data associated with whichever relay toward which the technician 188 has currently directed the electronic device 106.

In some embodiments, data associated with the relay 184 is presented by first retrieving the data from the asset database 112, or local copy of the asset database 114, as described previously. In some embodiments, data associated with the relay 184 is received directly from the relay 184. For example, the electronic device 106 may establish a wireless connection with the relay 184. The electronic device 106 may then retrieve identification, status, and operating parameters associated with the relay 184 directly from the relay 184. As described previously, the electronic device 106 may provide a hidden HMI that enables the technician 188 to directly control aspects of the relay 184.

While FIG. 7 illustrates relays 184 at a substation 182, other types of assets 102 can be utilized without departing from the scope of the present disclosure. For example, the substation 182 may include batteries, transformers, transmission lines, or other assets 102 for which a technician 188 may perform maintenance or observation.

Figure 8:
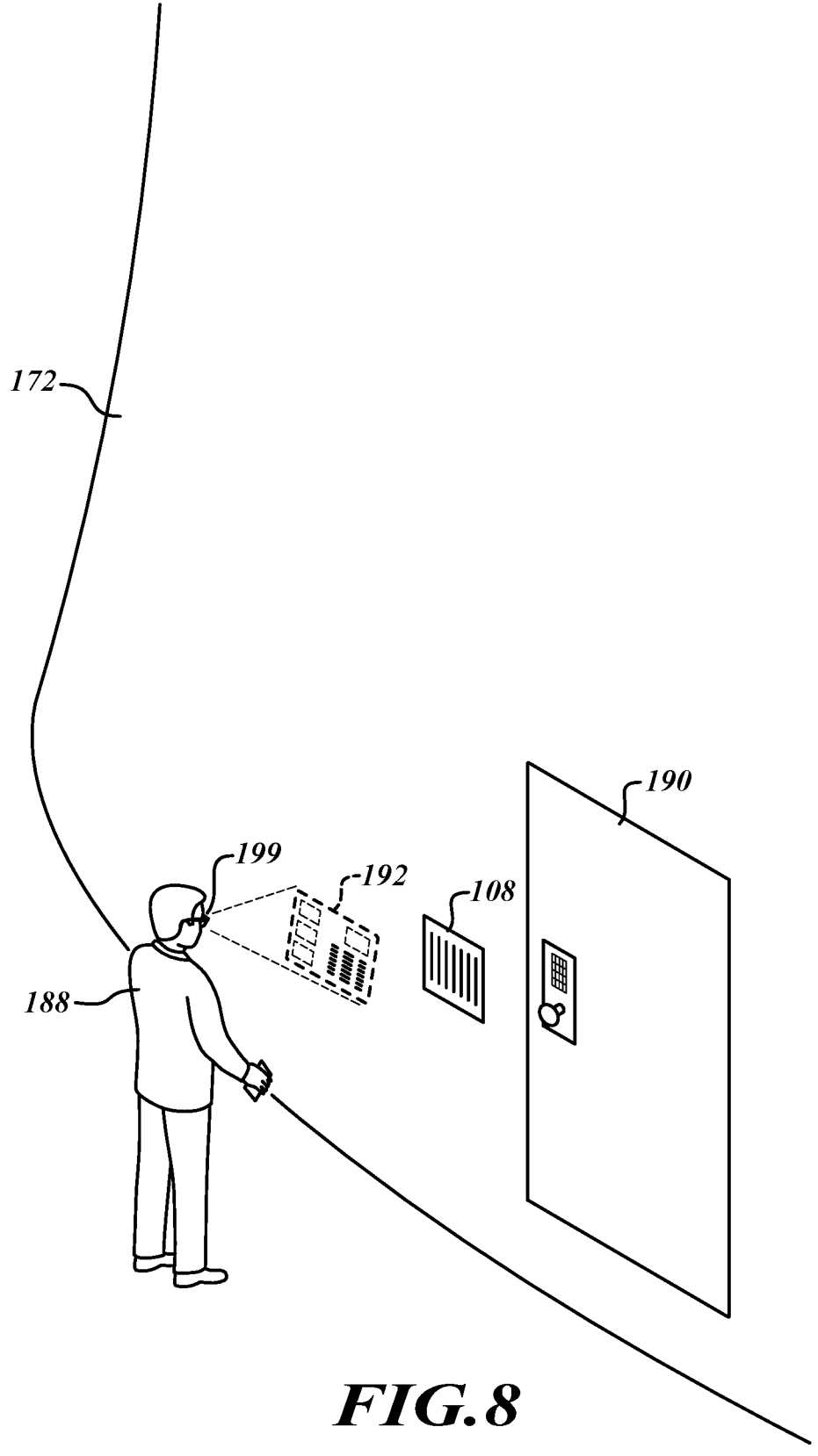
FIG. 8 is an illustration of a wind turbine, in accordance with some embodiments.

FIG. 8 illustrates a technician 188 in the vicinity of a wind turbine 172, in accordance with some embodiments. The technician 188 is wearing smart glasses 199. The smart glasses 199 are one example of an electronic device 106 of FIG. 1. The wind turbine 172 includes an identification marker 108 on the pylon of the wind turbine 172. When the user looks at the identification marker 108 with the smart glasses 199, the smart glasses scan the identification marker 108 and retrieve data 192 related to the wind turbine 172 based on the identification marker 108. The smart glasses 199 present data 192 in an AR presentation to the technician 188. Depending on the current operating status of the wind turbine 172, the technician 188 may decide whether to enter the door 190, or whether or not to put on further protective equipment prior to entering the door 190. The data 192 may provide a recommendation as to whether it is safe to enter the door 190 or whether particular types of safety equipment should be implemented or worn by the technician 188 prior to entering the door 190.

Figure 9:
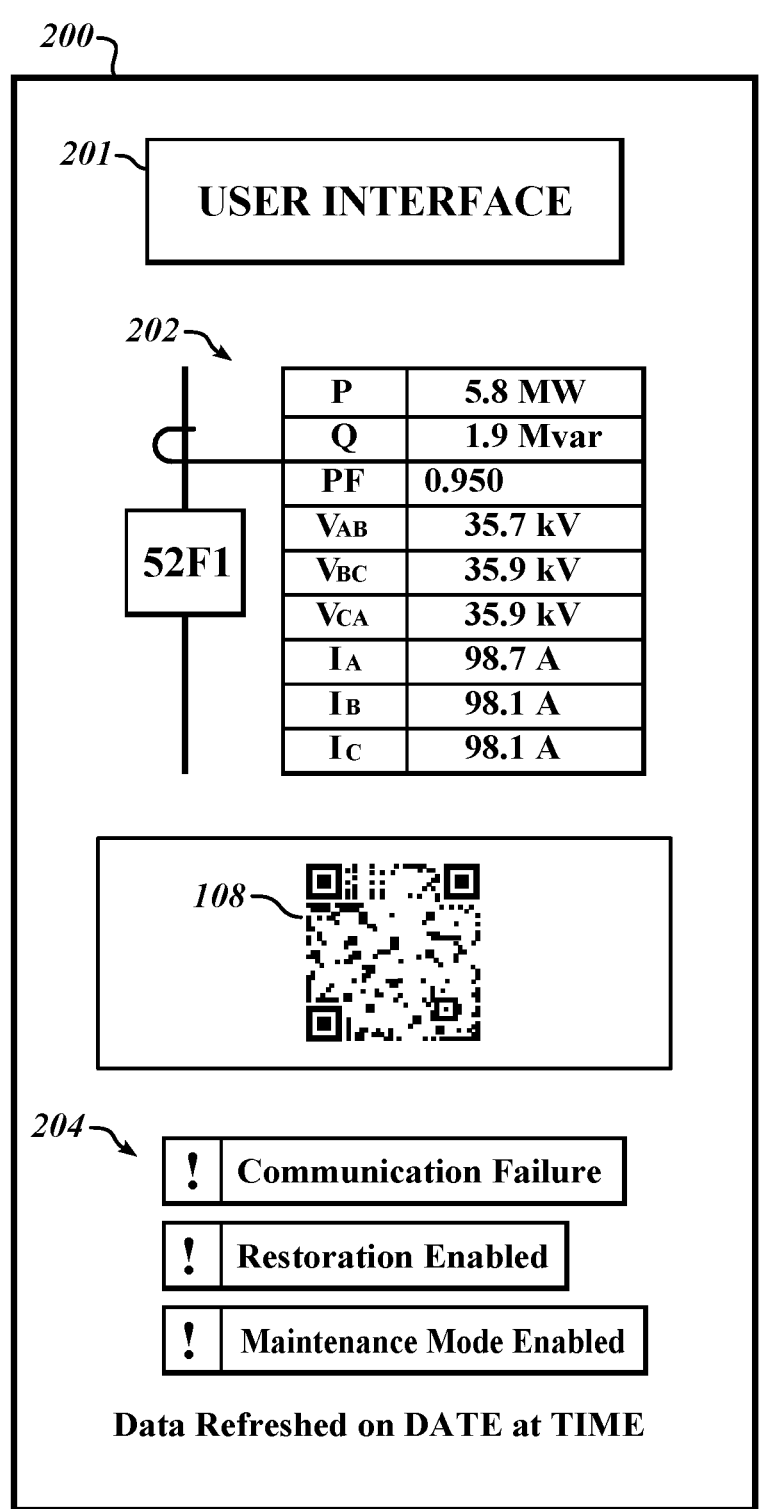
FIG. 9 is a representation of asset data presented to a technician by an electronic device, in accordance with some embodiments.

FIG. 9 is an illustration of data 200 presented by an electronic device 106 scanning an identification maker 108 of an asset 102, in accordance with some embodiments. In one example, the asset 102 is a relay 184. When the user directs the electronic device 106 to scan an identification marker 108 on the relay 184, the electronic device 106 presents data 200 to the user. The data 200 can include a user interface 201, current operating parameters 202, and operational mode data 204. In one example, the current operating parameters 202 may include power P, reactive power Q, a power factor PF, voltages Vab, Vbc, and Vca, currents Ia, Ib, Ic, or other types of operating parameters. The operational data 204 can indicate whether there is a communication failure with the asset 102, when the restoration is enabled, or whether a maintenance mode is enabled. The data 200 can also indicate the date and time at which the data was refreshed or updated. Various other types of data can be presented via the electronic device 106 without departing from the scope of the present disclosure. As used herein, scanning an identification marker 108 can include various methods for obtaining data from an identification marker including reading optical data, receiving wireless data, or other ways of obtaining data from an identification marker 108.

Figure 10:
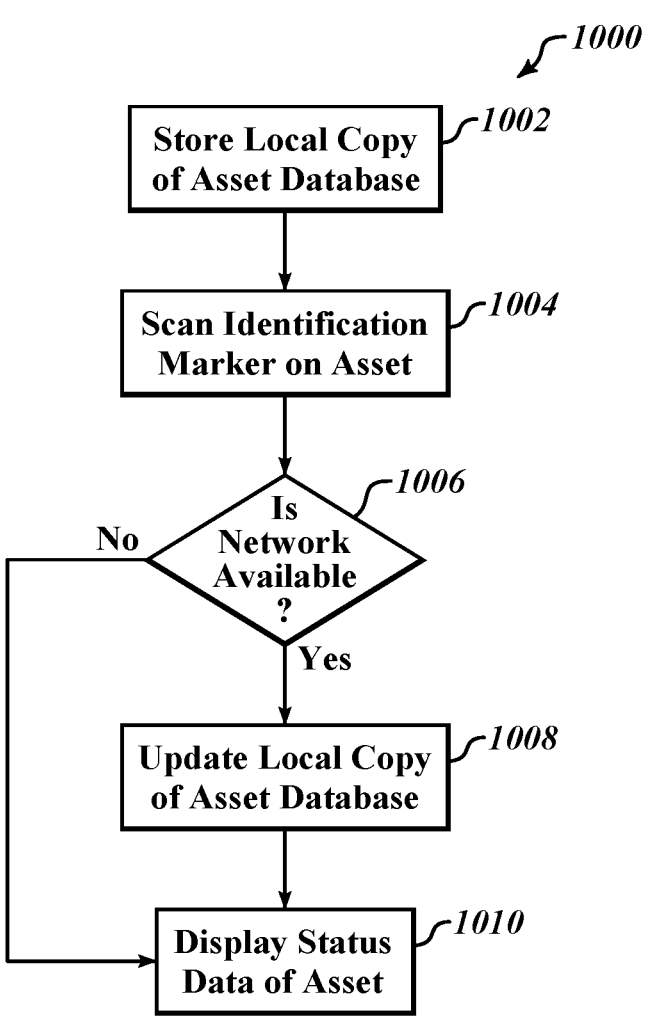

FIG. 10 is a flow diagram of a method 1000, in accordance with some embodiments. The method 1000 can utilize systems, components, and processes described in relation to FIGS. 1-9. At 1002, the method 1000 stores a local copy of an asset database on an electronic device. At 1004, the electronic device scans an identification marker on an asset. At 1006, the electronic device determines whether a communications network is available. If a communication network is available, then at 1008, the method 1000 updates the local copy of the asset database by syncing the local copy of the asset database with a master copy of the asset database managed by an asset management system. At 1010, the electronic device displays status data associated with the asset. If the network is not available, then at 1010, the electronic device displays the most recent data from the local copy of the asset database.

Figure 11:
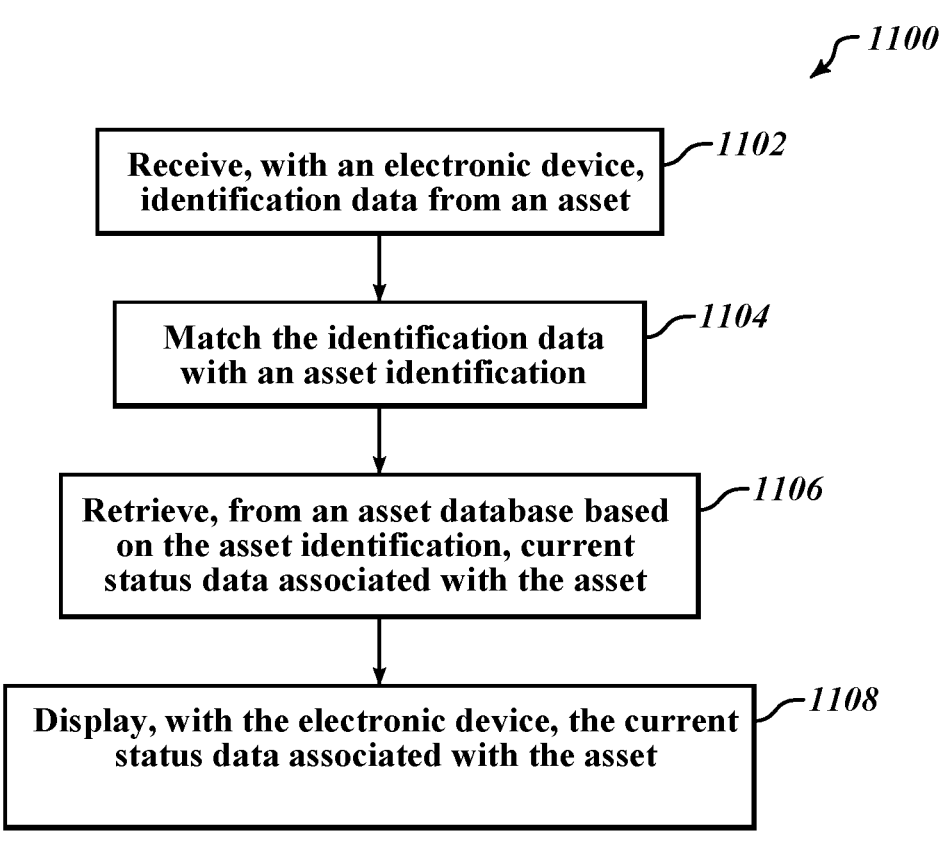

FIG. 11 is a flow diagram of a method 1100, in accordance with some embodiments. At 1102, the method 1100 includes receiving, with an electronic device, an identification from an asset. At 1104, the method 1100 includes matching the identification data with an asset identification. At 1106, the method 1100 includes retrieving, from an asset database based on the asset identification, current status data associated with the asset. At 1108, the method 1100 includes displaying, with the electronic device, the current status data.

Figure 12:
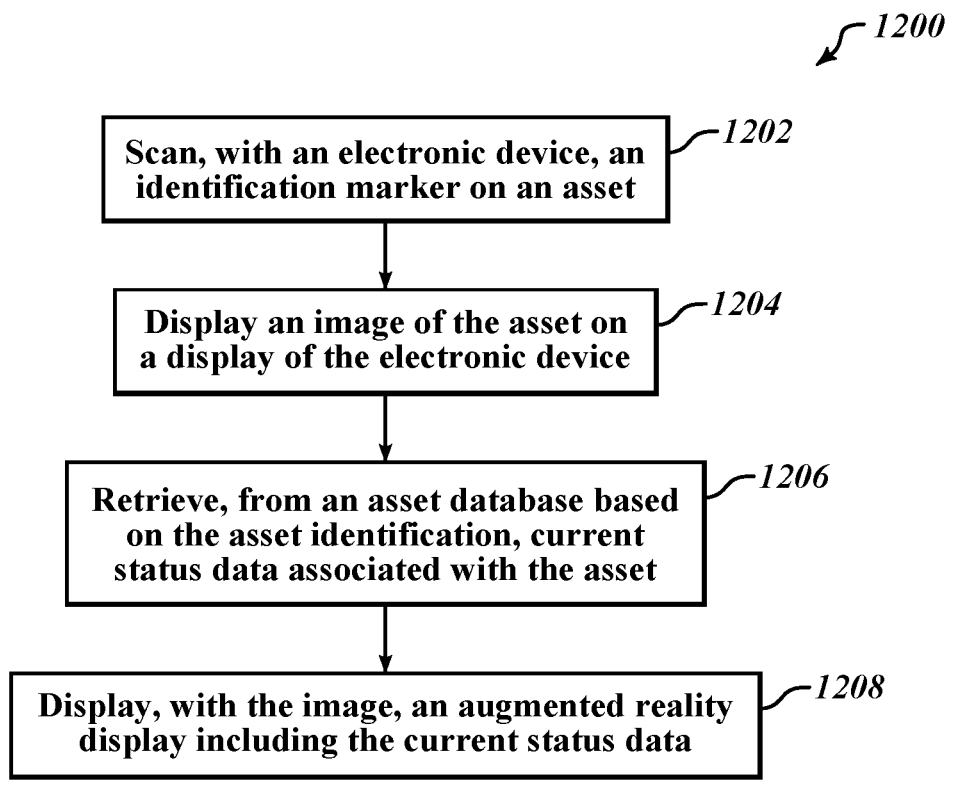

FIG. 12 is a flow diagram of a method 1200, in accordance with some embodiments. At 1202, the method 1200 includes scanning, with an electronic device, an identification marker on an asset. At 1204, the method 1200 includes displaying an image of the asset on a display of the electronic device. At 1206, the method 1200 includes retrieving, from an asset database based on the asset identification, current status data associated with the asset. At 1208, the method 1200 includes displaying, with the image, an augmented reality display including the current status data.

FIG. 13 is a flow diagram of a method 1300 in accordance with some embodiments. At 1302, the method 1300 includes sending, from an electronic device to an asset management system that manages a plurality of assets, a request to place a selected asset of the plurality of assets in a safety mode. At 1304, the method 1300 includes storing, on the electronic device, a local copy of a database that stores status data associated with the plurality of assets of 1306, the method 1300 includes receiving, while the electronic device is connected to a network, update data for a database that stores status data associated with the plurality of assets. At 1308, the method 1300 includes retrieving, from the local copy of the asset database based on the asset identification, current status data associated with the selected asset. At 1310, the method 1300 includes displaying, with the electronic device, the current status data including safety data indicating whether the asset is in a safety mode.

In one embodiment, a method includes scanning, with an electronic device, an identification marker on an asset and matching identification marker with an asset identification. The method includes retrieving, from an asset database based on the asset identification, current status data associated with the asset and displaying, with the electronic device, the current status data including safety data indicating whether the asset is in a safety mode.

In one embodiment, a method includes scanning, with an electronic device, an identification marker on a first asset and displaying an image of the first asset on a display of the electronic device. The method includes retrieving, from an asset database based on the asset identification, current status data associated with the first asset and displaying, with the image, an augmented reality presentation including the current status data.

In one embodiment, an electronic device includes an image sensor, a display, one or more processors, and one or more memories configured to store software instructions. The one or more processors are configured to execute the software instructions to perform a method. The method includes capturing, with the image sensor, an image of an identification marker on an asset, retrieving, from an asset database based on the asset identification, current status data associated with the asset, and displaying, with the electronic device, the current status data associated with the asset.

In one embodiment, a method includes sending, from an electronic device to an asset management system that manages a plurality of assets, a request to place a selected asset of the plurality of assets in a safety mode. The method includes storing, on the electronic device, a local copy of a database that stores status data associated with the plurality of assets and receiving, while the electronic device is connected to a network, update data for a database that stores status data associated with the plurality of assets. The method includes retrieving, from the local copy of the asset database based on the asset identification, current status data associated with the selected asset and displaying, with the electronic device, the current status data including safety data indicating whether the asset is in a safety mode.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

updating a local copy of an asset database onto an electronic device from a remote asset management system;

receiving, with an electronic device, identification data from an asset after updating the local copy of the asset database;

matching the identification data with an asset identification; retrieving, from the local copy of the asset database based on the asset identification, current status data associated with the asset; and displaying, with the electronic device, the current status data associated with the asset, including displaying recommended safety equipment for a user of the electronic device based on the current status.

2. The method of claim 1, further comprising displaying, with the electronic device, current operating parameters of the asset.

3. The method of claim 1, comprising periodically updating the asset database by syncing the local copy of the asset database with a primary asset database stored with an asset management system remote from the electronic device.

4. The method of claim 3, comprising displaying along with the current status data an indication as to whether the electronic device is able to update the asset database.

5. The method of claim 1, wherein the asset database is stored with an asset management system remote from the electronic device.

6. The method of claim 1, wherein the asset is part of a system that generates and distributes electricity.

7. The method of claim 6, wherein the asset includes:

a generator;

a voltage regulator;

a turbine;

a relay; or a breaker.

8. The method of claim 1, comprising:

displaying a real-time video stream of the asset with the electronic device; and displaying the current status data as an augmented reality presentation overlying the real-time video stream.

9. The method of claim 1, comprising displaying, with the electronic device, a human machine interface for controlling the asset.

10. The method of claim 1, wherein receiving identification data includes scanning an identification marker on the asset with the electronic device.

11. The method of claim 10, wherein the identification marker includes one or more of:

a QR code;

a barcode; and an alphanumeric string.

12. The method of claim 10, wherein scanning the identification marker includes receiving the identification data wirelessly.

13. The method of claim 12, wherein receiving the identification data wirelessly includes receiving the identification data via:

NFC;

or

Wi-Fi.

14. The method of claim 1, wherein the asset is part of a distributed network of assets.

15. The method of claim 14, wherein the distributed network includes:

a cellular network;

a water distribution network; or a sewage system.

16. The method of claim 1, wherein the asset includes industrial equipment.

17. The method of claim 16, wherein the asset includes:

mining equipment;

fossil fuel extraction or processing equipment; or transportation equipment.

18. The method of claim 1, wherein the current status data includes safety data indicating whether the asset is in a safety operating mode.

19. A method, comprising:

updating a local copy of an asset database onto an electronic device from a remote asset management system;

scanning, with the electronic device, an identification marker on a first asset after updating the local copy of the asset database;

displaying an image of the first asset on a display of the electronic device;

retrieving, from the local copy of the asset database based on the asset identification, current status data associated with the first asset; and displaying, with the image, an augmented reality presentation including the current status data, and presenting to the user, with the electronic device in response to scanning the identification marker, an option for the user to place the first asset in a safety mode.

20. The method of claim 19, wherein the augmented reality presentation includes a human machine interface for controlling the asset.

21. The method of claim 19, comprising:

scanning, with an electronic device, an identification marker on a second asset;

displaying an image of the second asset together with the image of the first asset on the display of the electronic device;

retrieving, from the asset database based on the asset identification of the second asset, current status data associated with the second asset; and displaying, with the images of the first and second assets, the current status data of the second asset with the augmented reality presentation.

22. An electronic device, comprising:

an image sensor;

a display;

one or more processors;

one or more memories configured to store software instructions, wherein the one or more processors are configured to execute the software instructions to perform a method, the method comprising:

uploading a local copy of an asset database onto an electronic device from a remote asset management system;

capturing, with the image sensor, an image of an identification marker on an asset after updating the local copy of the asset database;

retrieving, from the local copy of the asset database based on the asset identification, current status data associated with the asset;

displaying, with the electronic device, the current status data associated with the asset; and automatically placing the asset in safety mode upon scanning the identification marker.

23. The electronic device of claim 22, wherein the method includes displaying the current status data in an augmented reality presentation.

24. The electronic device of claim 22, wherein the software instructions include an asset management application.

25. A method, comprising:

sending, from an electronic device to an asset management system that manages a plurality of assets, a request to place a selected asset of the plurality of assets in a safety mode;

storing, on the electronic device, a local copy of a database that stores status data associated with the plurality of assets;

receiving, with the electronic device after storing the local copy of the asset database, an asset identification from a marking on the selected asset;

retrieving, from the local copy of the asset database based on the asset identification, current status data associated with the selected asset;

displaying, with the electronic device, the current status data including safety data; and automatically placing the asset in safety mode upon scanning the identification marker.

26. The method of claim 25, wherein the electronic device includes:

a mobile phone;

a tablet; or smart glasses.

27. The method of claim 25, wherein the plurality of assets generate or distribute electricity.

\* \* \* \* \*